United States Patent Office 3,416,309
Patented Dec. 17, 1968

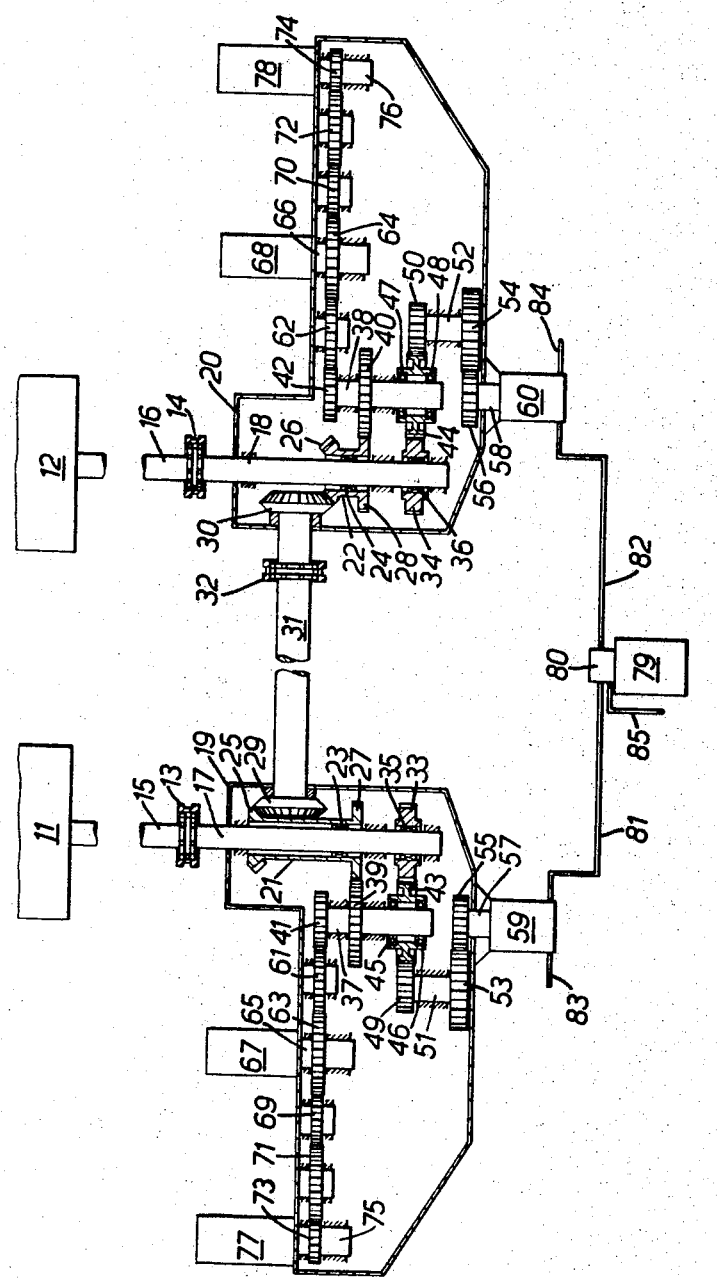

3,416,309
ENGINE INSTALLATIONS AND STARTING MEANS THEREFOR
Robert T. Elmes, Birdlip, and Arthur H. Lane, Innsworth, England, assignors to Dowty Rotol Limited, Gloucester, England, a British company
Filed Nov. 22, 1966, Ser. No. 596,307
Claims priority, application Great Britain, Dec. 7, 1965, 51,840/65
10 Claims. (Cl. 60—39.15)

ABSTRACT OF THE DISCLOSURE

An engine installation which has at least two engines each connected to drive a respective accessory gearbox, and thus accessories mounted thereon, includes gas turbine-type starter means, one for each engine, mounted upon the respective gearbox. It is arranged that the engine which is running at the fastest speed alone drives the accessories on all the gearboxes, and the starting means is such that when all the engines are inoperative one or other of said means can be employed to drive all the accessories on the gearboxes, gas for operating the starter means being derived from a single gas generator.

---

This invention relates to engine installations and starting means therefor.

According to the invention an engine installation, having at least two engines each of which is connected to drive at least one accessory mounted upon a respective gearbox, includes starter means, one for each engine, and mounted upon the respective gearbox, a single gas generator connectible to supply gas for operation of each starter means in turn, and shafting for interconnecting the gear trains of said gearboxes, the arrangement being such that with all the engines inoperative, the accessory or accessories on at least one of the gearboxes can be powered through the starter means by the gas generator.

Clutch means may be provided in said shafting, while further clutch means may be provided in the drive between each engine and its respective gearbox.

First free-wheel devices may be provided in the gear trains of all the gearboxes, so that when all the gearboxes are interconnected, the engine which is running at the faster or fastest rotational speed alone drives the accessories on all the gearboxes, the devices permitting that engine to overrun the drives from the other engine or engines.

Each starter means may comprise a starter motor of gas turbine type.

The installation may be designed to power aircraft and the accessories carried upon the gearboxes used to power electrical and/or hydraulic services within the aircraft.

Second free-wheel devices may be provided in the gear trains in all of the gearboxes so that each starter means can be stopped when its associated engine is running at and above its self-sustaining speed.

The invention further includes a control system associated with the starter means, the gas generator and the clutch means, which system includes a selector for appropriate direction of gas from the gas generator to whichever starter means is required to be operated.

One embodiment of the invention will now be particularly described by way of example with reference to the accompanying diagrammatic drawing.

In this drawing two gas turbine engines 11 and 12, suitable for installation in an aircraft (not shown) include clutches 13 and 14, respectively, associated with their power output shafts 15 and 16. Shafts 17 and 18 are respectively taken from the clutches 13 and 14 into gearboxes 19 and 20 where they carry double gear wheels 21 and 22 respectively. First free-wheel devices 23 and 24 are respectively provided between the double gear wheels and their shafts 17 and 18.

The double gear wheels each have a ring of bevel teeth 25, 26 and a ring of spur teeth 27, 28. The bevel teeth 25 and 26 respectively mesh with bevel gears 29 and 30 carried at the end portions of a shaft 31 which interconnects the gear trains contained in the gearboxes 19 and 20. A clutch 32 is provided in the shaft 31.

The shafts 17 and 18 also respectively carry spur gears 33 and 34, second free-wheel devices 35 and 36 being provided between the respective shaft and gear.

Mounted for rotation in a manner parallel with the shafts 17 and 18 are shafts 37 and 38. These shafts respectively have spur gears 39 and 40 fast therewith which mesh with the spur teeth 27 and 28 formed on the double gear wheels 21 and 22 respectively. At the upper end portions in the drawing of the shafts 37 and 38 smaller spur gears 41 and 42 are also provided fast therewith.

Near the lower end portions of the shafts 37 and 38 further spur gears 43 and 44 are provided, these being mounted on the shafts by ball bearings 45, 46 and 47, 48, respectively.

The gears 43 and 44 are in mesh with gears 49 and 50, respectively fast with shafts 51 and 52. These shafts also have fast therewith spur gears 53 and 54, themselves in mesh with gears 55 and 56. The gears 55 and 56 are respectively fast upon output shafts 57 and 58 of gas turbine-type starter motors 59 and 60 mounted on the casing of the gearboxes 19 and 20 respectively.

The spur gears 41 and 42 are in mesh with spur gears 61 and 62, respectively, which in turn mesh with spur gears 63 and 64 whose shafts 65 and 66 are each connected to drive an hydraulic pump 67, 68, respectively, also mounted on the outside of the casing of the respective gearbox.

The gears 63 and 64 respectively mesh with gears 69 and 70 which themselves are in mesh with gears 71 and 72. The gears 71, 72 respectively mesh with gears 73, 74, the shafts 75 and 76 of which are connected to drive a constant speed drive and alternator, 77 and 78, one such set being mounted on each gearbox.

A single gas generator 79 is provided for the installation, a selector 80 being provided in association with the gas generator and pipes 81 and 82 being taken from the selector to the starter motors 59 and 60 respectively.

Although shown diagrammatically in the drawing, the gas generator includes a combustion chamber (not shown), into which compressed air and liquid fuel are introduced, the mixture of air and fuel being burnt to produce high velocity gases which pass through the selector.

Exhaust pipes 83 and 84 are taken from the starter motors to atmosphere.

The selector 80 is also connected to receive a feed pipe 85 to enable the starter system to be powered from a source other than the gas generator 79, such as a ground supply

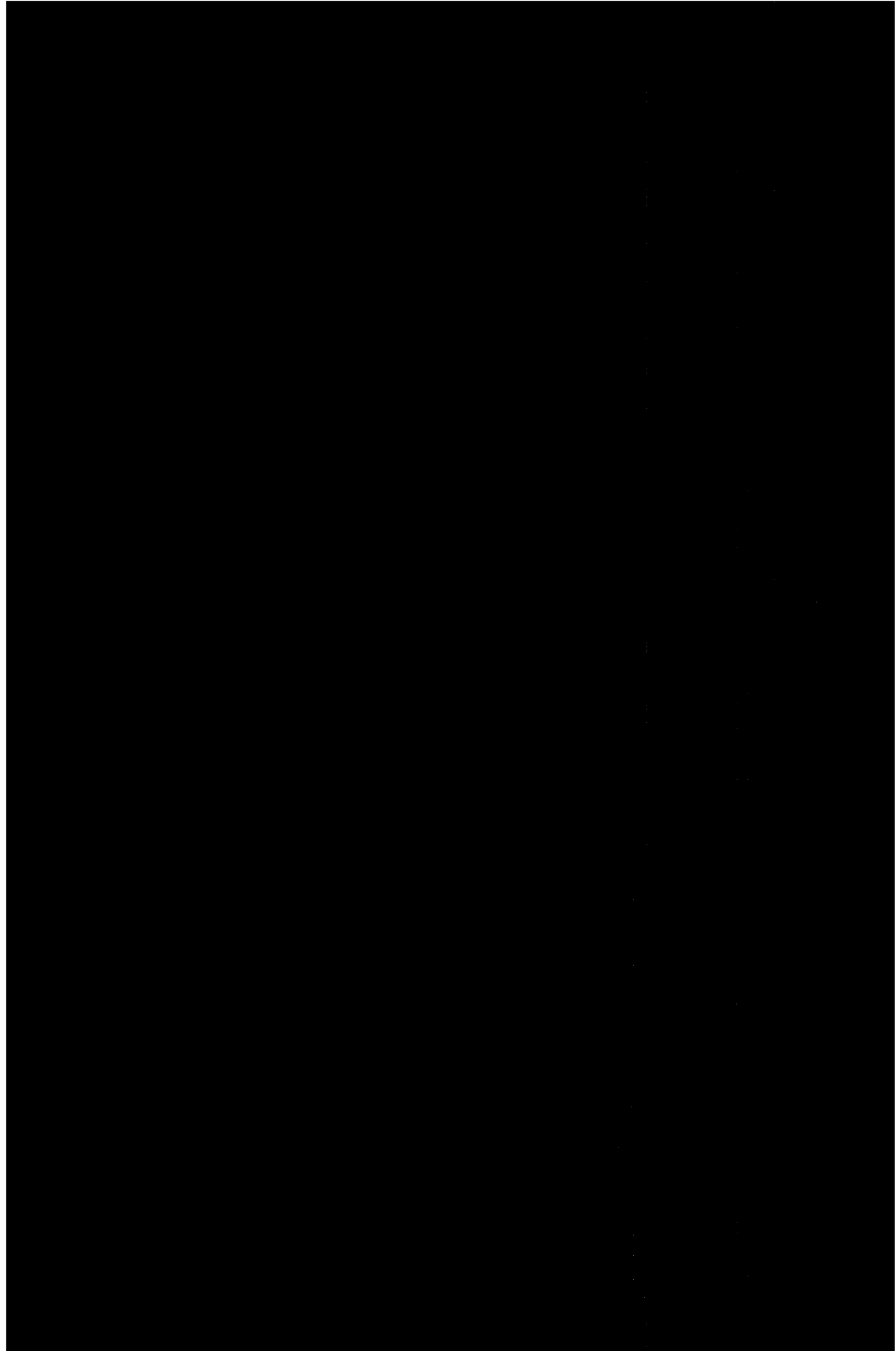

is also a clutch device in the shaft whereby either starter motor can be operated to drive only the geartrain associated with the engine thereof.

9. The combination according to claim 7 further comprising a free-wheeling device in the connection between each starter motor and its associated geartrain whereby when the engine thereof is running at a self-sustaining speed, the motor can be stopped.

10. The combination according to claim 7 wherein the starter motors are turbine powered and are fed by a single source of gas, there being means for directing the feed to either motor on a selective basis.

References Cited

UNITED STATES PATENTS

| 2,611,239 | 9/1952 | Briggs | 60—39.14 |
| 2,723,531 | 11/1955 | Wosika et al. | 60—39.15 XR |
| 2,851,113 | 9/1958 | Irwin et al. | 60—39.15 XR |

JULIUS E. WEST, *Primary Examiner.*

U.S. Cl. X.R.

60—39.14, 102